(12) United States Patent
Harvey et al.

(10) Patent No.: US 7,290,164 B1
(45) Date of Patent: Oct. 30, 2007

(54) METHOD OF REVERTING TO A RECOVERY CONFIGURATION IN RESPONSE TO DEVICE FAULTS

(75) Inventors: Andrew G. Harvey, Pleasanton, CA (US); John Ng, Fremont, CA (US); Gilbert R. Woodman, III, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 461 days.

(21) Appl. No.: 10/792,946

(22) Filed: Mar. 3, 2004

(51) Int. Cl.
*G06F 11/00* (2006.01)
(52) U.S. Cl. ........................................................ 714/2
(58) Field of Classification Search ................ 714/2, 714/19, 4; 709/220, 227
See application file for complete search history.

(56) References Cited

U.S. PATENT DOCUMENTS

| | | | |
|---|---|---|---|
| 5,050,070 A | | 9/1991 | Chastain et al. |
| 5,150,464 A | | 9/1992 | Sidhu et al. |
| 5,274,771 A | | 12/1993 | Hamilton et al. |
| 5,351,040 A | * | 9/1994 | Matsuura et al. ............ 370/223 |
| 5,778,323 A | * | 7/1998 | Dorenbosch et al. ........ 455/561 |
| 5,948,077 A | | 9/1999 | Choi et al. |
| 6,363,499 B1 | * | 3/2002 | Delo et al. .................... 714/15 |
| 6,430,541 B1 | | 8/2002 | Brown et al. |
| 6,438,749 B1 | * | 8/2002 | Chamberlain ................ 717/174 |
| 6,523,070 B1 | | 2/2003 | Stapleton et al. |
| 6,587,827 B1 | | 7/2003 | Hennig et al. |
| 6,647,510 B1 | * | 11/2003 | Ganesh et al. ................ 714/16 |
| 6,654,726 B1 | | 11/2003 | Hanzek |
| 6,769,074 B2 | * | 7/2004 | Vaitzblit ....................... 714/16 |
| 6,907,602 B2 | * | 6/2005 | Tsai et al. ..................... 717/168 |
| 7,017,155 B2 | * | 3/2006 | Peev et al. .................... 717/176 |
| 2002/0001307 A1 | | 1/2002 | Nguyen et al. |
| 2002/0133573 A1 | | 9/2002 | Matsuda et al. |
| 2003/0009752 A1 | * | 1/2003 | Gupta .......................... 717/171 |
| 2003/0061315 A1 | | 3/2003 | Jin |
| 2003/0061320 A1 | | 3/2003 | Grover et al. |
| 2003/0108039 A1 | * | 6/2003 | Shell et al. ................... 370/389 |
| 2003/0121033 A1 | * | 6/2003 | Peev et al. .................... 717/175 |

FOREIGN PATENT DOCUMENTS

GB   2006/010952   * 2/2006

OTHER PUBLICATIONS

Netility Corporation, "Netility Makes Patent-Pending Auto-Configuration and Auto-Update Technology Available for Licensing," http://www.netility.com/technology-licensing_pr.html, printed Sep. 2, 2003.

(Continued)

*Primary Examiner*—Bryce P. Bonzo
*Assistant Examiner*—Amine Riad
(74) *Attorney, Agent, or Firm*—Hickman Palermo Truong & Becker LLP

(57) ABSTRACT

A method is disclosed for reverting to a recovery configuration in response to device faults. A change to the configuration is received. The change may be in the form of configuration instructions that comprise input from a user identifying changes to be made to the configuration information reflecting the configuration of cards or interface devices in the device. A user, an IT administrator or the like can provide configuration instructions. The device may change its current configuration to a new configuration based upon the configuration instructions. If a loss of connectivity resulting from the configuration change is detected, the device will recover from the loss of connectivity by reverting to a recovery configuration.

38 Claims, 8 Drawing Sheets

OTHER PUBLICATIONS

Cisco Systems, Inc., "Programmable Network Solutions, Business and Operational Challenges," White Paper, 1992-2002, pp. 1-7.

Cisco Systems, Inc., "Sigma and Cisco Systems Service Fulfillment Offering for Advanced IP Services," 1992-2001, pp. 1-6.

Cisco Systems, Inc., "Cisco DSL Manager, Maintaining System Performance," 1992-2003, http://www.cisco.com/en/US/products/sw/netmgtsw/ps826/product_user_guide_chapter09186ao0, data retrieved Oct. 22, 2003, pp. 1-8.

Cisco Systems, Inc., "Simple Network-Enabled Auto-Provisioning for Cisco IAD2420 Series IADs," undated, pp. 1-26.

Nortel Networks, "Passport 6400 Express Manager," Product Brief, 2000, pp. 1-4.

Netility Corporation, "Products and Technology Overview," http://www.netility.com/pasover.html, printed Sep. 2, 2003, pp. 1-2.

Netility Corporation, "3400 Business Gateway Product Overview," http://www.netility.com/3400_overview.html, printed Sep. 2, 2003, pp. 1-4.

Netility Corporation, "Netility Announces First Auto-Configuring G.SHDSLCPE," Dec. 11, 2001, http://www.netility.com/3400_pr.html, printed Sep. 2, 2003, pp. 1-2.

Netility Corporation, "Frequently Asked Questions," http://www.netility.com/faq.html, printed Sep. 9, 2003, pp. 1-3.

Netility Corporation, "Products/Solutions Overview," http://www.netility.com/3100_overview.html, printed Sep. 2, 2003, pp. 1-2.

Netility Corporation, "3100 Product Overview," undated, 3 pages.

Netility Corporation, "Network Access Device User's Guide, Model 3100," Jun. 5, 2001, pp. 1-64.

Netility Corporation, "Netility Redefines SDSL Deployment with First Auto-Configuring CPE," Oct. 1, 2001, http://www.netility.com/3100_pr.html, printed Sep. 2, 2003, pp. 1-2.

Netility Corporation, "Netility Technology Overview," http://www.netility.com/technology_overview.html, printed Sep. 2, 2003, 1 page, copy not provided.

Netility Corporation, "Netility Configuration System," http://www.netility.com/nc.html, printed Sep. 2, 2003, 1 page.

* cited by examiner

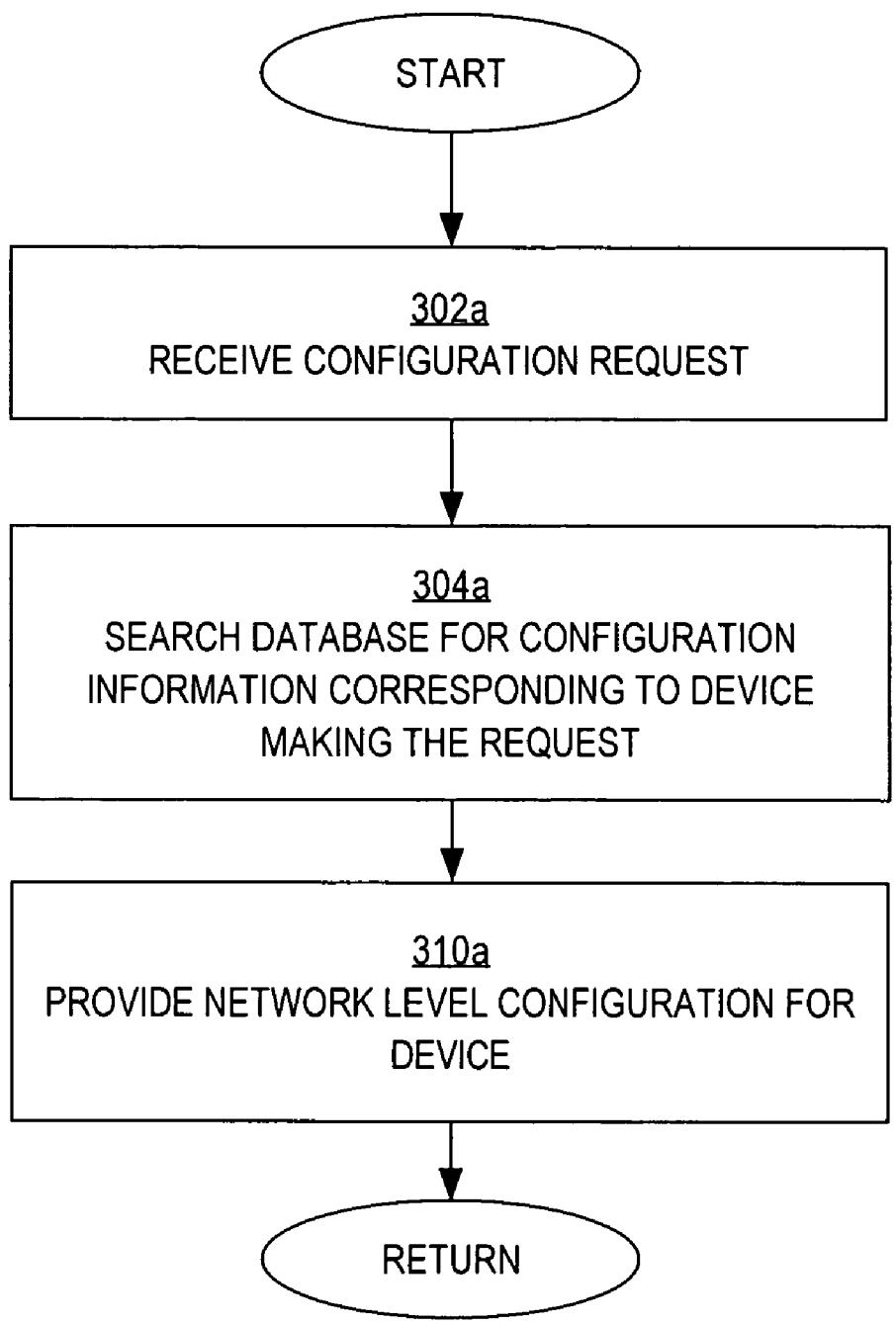

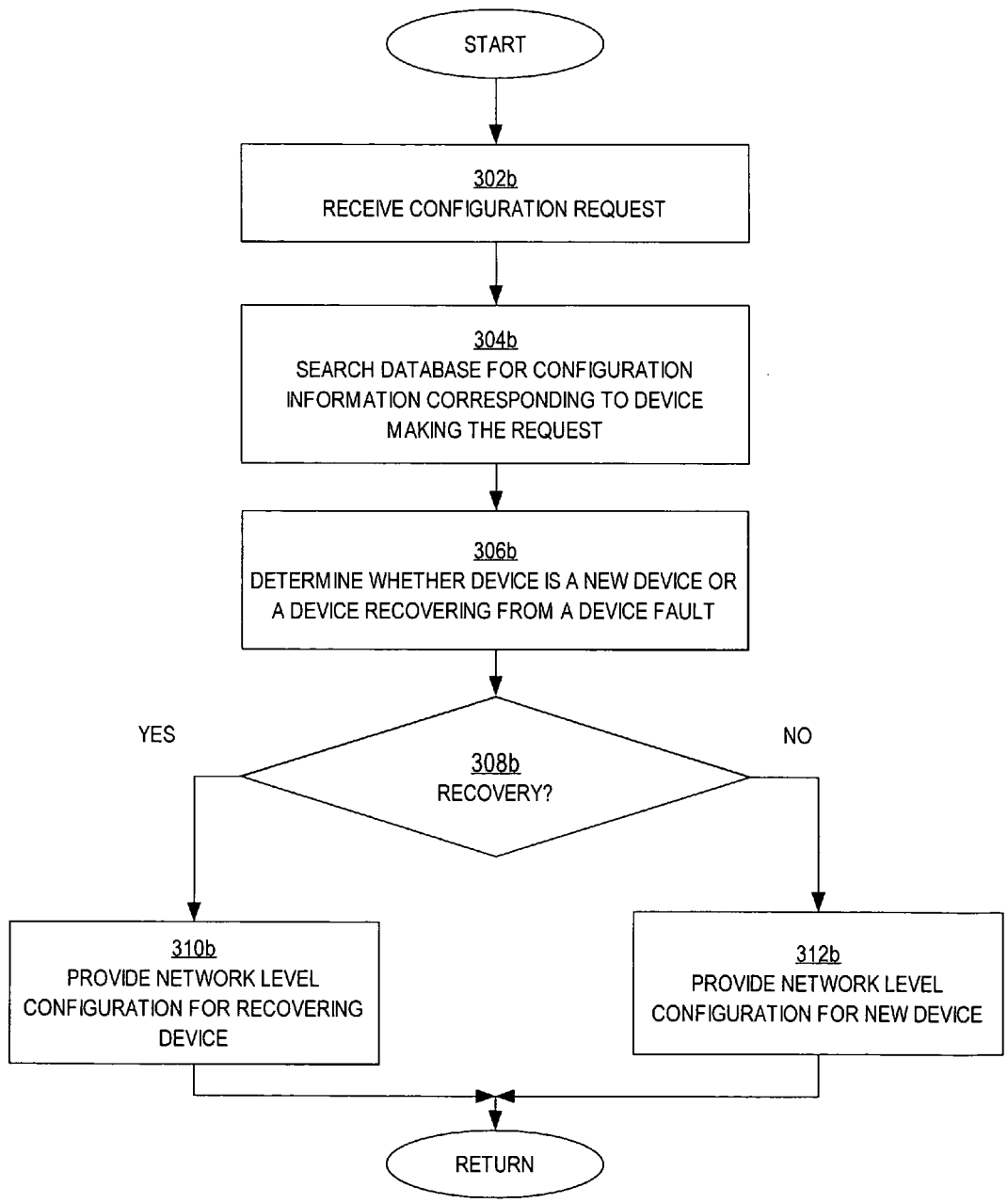

METHOD OF REVERTING TO A RECOVERY CONFIGURATION IN RESPONSE TO DEVICE FAULTS

FIELD OF THE INVENTION

The present invention generally relates to deploying network devices. The invention relates more specifically to a method of reverting to a recovery configuration in response to device faults.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network service providers desire to provide for deployment and maintenance of customer premises equipment (CPE) devices, such as broadband routers and the like, which may be used for residences and small businesses. Automatic network configuration provisioning approaches may provide for generating and downloading sets of configuration instructions, or configuration files, for network devices that are deployed in the field to subscribers of services provided by service providers. It is desirable to be able to perform such provisioning automatically, however, without requiring a subscriber to manually enter configuration commands, and without requiring a technician associated with a network service provider to visit the subscriber and configure the device.

In one example approach, a vendor manufactures customer premises equipment network devices, and "dropships" the CPEs to the premises of subscribers of a network service provider. The CPEs are shipped with a generic bootstrap or minimal configuration that is copied from or generated at the vendor based on a standard template or format specified by the service provider. When a subscriber installs and powers-up a CPE, under control of the bootstrap configuration the CPE uses an interface specified in the bootstrap configuration to contact a configuration manager associated with the service provider. The configuration manager downloads a permanent, application-specific configuration to the CPE, which executes the received configuration and begins normal operation.

In the process described above, the startup configuration is typically overwritten in memory and there is no current provision for persistent storage of the initial minimal configuration. As a result, if the permanent configuration is lost or modified in a way that prevents the CPE and the network management system from communicating, there is no way to recover that communications in an automatic manner. Typically, a technician or other skilled service person must travel to the customer's premises to manually reconfigure the device.

One approach that addresses these issues uses a rollback mechanism that saves a current configuration or configurations at periodic intervals, and enables the user to rollback to a previous configuration. While at first glance this approach seems to address lost or corrupted configuration issues, in reality such rollback approaches are fraught with difficulty. One disadvantage to rollback approaches is that there is no certainty that because a prior configuration worked in establishing connectivity that the prior configuration will still be workable in a current environment. Network environments are fluid and accordingly, what worked yesterday may not work tomorrow. In particular, security related network parameters, such as certificates, passwords and the like, change with time. Systems designed to recognize security related parameters do not track the history of these parameters. Such systems will not recognize a previous password or an outdated certificate as an attempt to reestablish connectivity after a device fault or corruption of a configuration file.

Based on the foregoing, there is a clear need for improved recovery capabilities for remotely installed devices to recover from a device fault or a corrupted device configuration.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a flow diagram that illustrates a high level overview of one embodiment of processing for providing a network configuration to a device connecting with a recovery configuration;

FIG. 3B is a flow diagram that illustrates a high level overview of one embodiment of processing for providing a network configuration to a device connecting with a recovery configuration.

DETAILED DESCRIPTION

Figure 1:
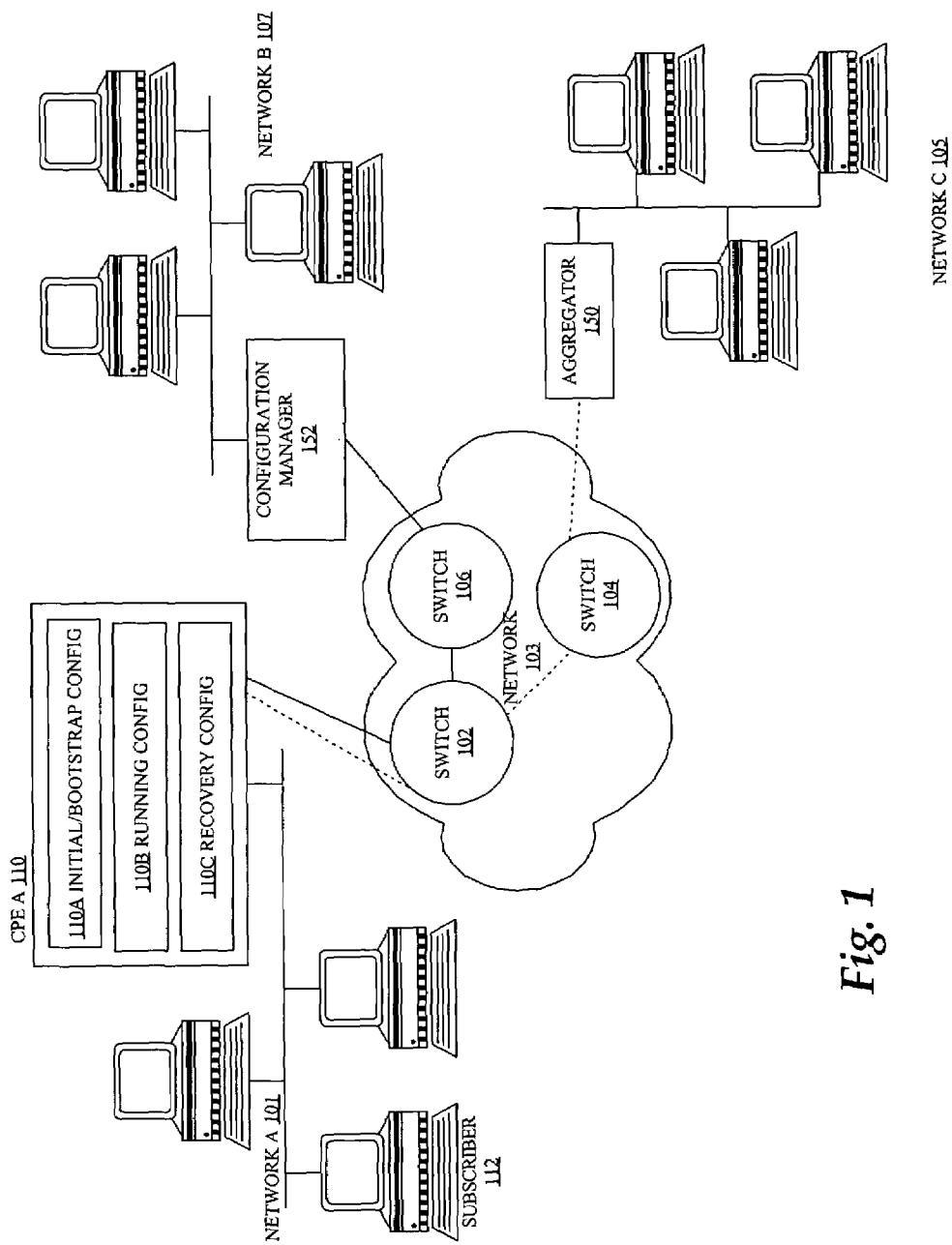
FIG. 1 is a block diagram depicting an example network in which reverting to a recovery configuration may be implemented in one embodiment of the invention.

A method and apparatus for reverting to a recovery configuration in response to device faults in various embodiments is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Structural and Functional Overview
  3.0 Method for Reverting to a Recovery Configuration in Response to Device Faults
    3.1 Overview
    3.2 Process of Changing a Configuration
    3.3 Process of Detecting a Device Fault
    3.4 Process of Reverting to a Recovery Configuration
    3.5 Process of Providing a Network Configuration to a Device Connecting with a Recovery Configuration
  4.0 Implementation Mechanisms-Hardware Overview
  5.0 Extensions and Alternatives

1.0 General Overview

The needs identified in the foregoing Background, and other needs and objects that will become apparent for the following description, are achieved in the present invention, which comprises, in one aspect, a method for reverting to a recovery configuration in response to device faults. Network devices such as routers and switches and the like maintain a configuration state using a text format file also known as a "configuration file," or just "configuration" as used herein. The configuration reflects the various services, functions, parameters and interface devices with which the device may be equipped. A change to the configuration is received. The change may be in the form of configuration instructions that comprise input from a user identifying changes to be made to the configuration information reflecting the configuration of cards or interface devices in the device. A user, such as an IT administrator or the like can provide configuration instructions. The device may change its current configuration to a new configuration based upon the configuration instructions. If a loss of connectivity resulting from the configuration change is detected, the device will recover from the loss of connectivity by reverting to a recovery configuration. A recovering device may be revert to a recovery configuration that is identical to a new device joining the network, or may revert to a recovery configuration that is different from that of a new device.

Changing the current configuration to a new configuration based upon the configuration instructions includes a variety of steps. The device detects whether the new configuration will require a change to the current configuration of the device. If a change to the configuration is needed, the device makes the proposed change and uses the result as the current configuration. An indication that the configuration is in a state of pending commit is set. In one embodiment, a flag is set to indicate the pending commit state.

In one embodiment, the step of detecting a loss of connectivity resulting from the configuration change further comprises starting a timer. The device listens for a connection to be established. If a timeout is detected before an indication that a connection has been established, a recovery routine is invoked. If a connection is established, the configuration is moved from the "pending commit" state to the "commit" state and the processing for configuration change completes.

In one embodiment, the step of recovering from the loss of connectivity by reverting to a recovery configuration further comprises making a recovery configuration the current configuration. The recovery configuration is stored in a persistent storage of the device in association with manufacturing the device, in one embodiment. Connectivity to a configuration manager is established using the recovery configuration. A network level configuration may be received from the configuration manager once connectivity is established. The current configuration is replaced with the network level configuration received from the configuration manager.

In one embodiment, the recovery configuration is the same as a boot configuration that is loaded onto the device for initial boot up of the device at the customer's site. In embodiments that use identical boot and recovery configurations, the device can establish connectivity with the configuration manager as a new device.

In an alternative embodiment, the recovery configuration differs from a boot configuration. In embodiments having a unique recovery and boot configurations, the device can establish connectivity with the configuration manager as a device seeking reconfiguration after recovering from an error or device fault.

In one embodiment, retrieving the recovery configuration includes obtaining security credentials. The security credentials enable the device to establish connectivity to the configuration manager. Security credentials may include public or private cipher keys, certificates and the like in various embodiments.

In one embodiment, retrieving the recovery configuration includes obtaining a configuration for a state that enables the device to establish connectivity to a configuration manager in order to obtain a network level configuration even if the device's configuration has been corrupted or is in an unknown state.

In one embodiment, the method additionally includes receiving an updated recovery configuration. The device can then replace the recovery configuration with the updated recovery configuration. In this way, the recovery configuration can be kept current as the network environment changes.

In one embodiment, receiving an updated recovery configuration includes connecting to a configuration manager using a maintenance network connection and receiving the updated configuration from the configuration manager.

In one embodiment, the method further includes blocking changes to the recovery configuration. In such embodiments, the recovery configuration is made read only to the customer.

In another aspect, the present invention provides in one embodiment, a method for providing a network configuration to a device connecting with a recovery configuration. According to the method, the configuration manager receives a request from a device for a device configuration. The configuration manager searches in a database for a device configuration corresponding to an identifier of the device associated with the request. The configuration server may provide a network level configuration for the device to the device making the request.

In one embodiment, the method further includes verifying security credentials of the device provided with the request. If the security credentials are invalid, the configuration manager denies the request.

In one embodiment, the method further includes receiving an update to a recovery configuration for network devices. The configuration manager will send the updated recovery configuration to the device as appropriate.

In one embodiment, the configuration manager may determine based upon information in the database whether the device is either a new device or a device requesting a reconfiguration after reverting to a recovery configuration. The configuration manager may change its behavior accordingly. For example, in one embodiment, a different configuration is provided to the requesting device if the device is seeking to be reconfigured after reverting to a recovery configuration as compared with a newly installed device.

In other aspects, the invention encompasses a computer apparatus and a computer-readable medium configured to carry out the foregoing steps.

2.0 Structural and Functional Overview

FIG. 1 is a block diagram depicting an example network in which reverting to a recovery configuration may be implemented in one embodiment of the invention. While the invention is illustrated generally with reference to an example of a device deployed in a service provider environment, the present invention does not require such an environment, and in some embodiments, techniques according to the invention may be implemented in devices deployed in enterprise or home environments.

As shown in FIG. 1, a device CPE A 110 is installed at a customer's premises. In the example configuration depicted by FIG. 1, CPE A 110 has been installed by an IT administrator of a Network A 101 in order to connect Network A 101 to another network, such as network 103. Networks 101 and 103 may any type of network. In other example configurations, CPE A 110 may be installed by the customer in order to provide an interface for a computer to an external network such as Network 103. Accordingly, in various example configurations, CPE A 110 may be a DSL modem, a cable modem, a router, a wireless access point or various combinations thereof.

When the CPE A 110 is installed, it is communicatively coupled to a switch 102 of network 103 to establish a physical connection. Once properly configured, the CPE A device 110 is capable of connecting to an aggregator 150 through the network 103. Aggregator 150 is coupled to a network C 105. In the embodiment illustrated by FIG. 1, a configuration manager 152 is communicatively coupled to network B 107. In specific embodiments, configuration manager 152 may be on the same network as aggregator 150, for example. Configuration manager 152 comprises configuration information, which may be exchanged with CPE A 110 in order to reconfigure the CPE A 110 in the event that the CPE A 110 device suffers a configuration error or a device fault. The ability to automatically configure a remotely installed device, such as CPE A 110 in the event that the CPE A 110 loses its configuration information is provided by one embodiment that will be discussed in further detail below.

As can be seen from FIG. 1, a path may be established from CPE A 110 to configuration manager 152 via switch 102 and switch 106 of network 103 as indicated by a solid line in FIG. 1. Accordingly, a recovery configuration for CPE A 110 need only provide sufficient information for the CPE A 110 to establish the connection with the configuration manager 152 in order to obtain complete and current configuration information (herein referred to as a network level configuration) in order to then connect with other devices, such as aggregator 150, for example using the network 103.

Once a customer installs CPE A 110 in network A 101, the CPE A 110 establishes connectivity with the configuration manager 152 using a generic or "boot strap" configuration loaded into the CPE A 110 prior to shipment to the customer.

According to one embodiment, a generic or "boot" configuration is 110A loaded as the current configuration of CPE A 110 during manufacture. This "boot" configuration is used to bootstrap the CPE A 110 upon installation and startup in order to establish connectivity with the configuration manager 152. A persistent or running configuration 110B is then received from the configuration manager 152. In one embodiment, a recovery configuration 110C. may also be loaded onto CPE A 110 during the time of manufacture. In the event that later changes to the current configuration information for the CPE A 110 overwrite the boot configuration, the CPE A 110, upon detecting a loss of connectivity resulting from changes to the configuration, can revert to the recovery configuration. The CPE A 110 uses the recovery configuration to re-establish connectivity with the configuration manager 150 in order to obtain a network level configuration which may be used by the CPE A 110 to regain connectivity to other devices in the network 103.

According to one embodiment, the recovery configuration comprises a minimal configuration that contains instructions which, when executed by CPE A 110, enable the device to determine which of several line cards or interfaces in the device can communicate through network 103 to configuration manager 152. In some embodiments, configuration manager 152 may periodically refresh the recovery configuration 110C with an updated version, e.g., as changes occur in network 103.

According to one embodiment, the configuration manager 152 creates and transmits a configuration based on a configuration template to the CPE A 110. According to one embodiment, configuration manager 152 provides the network level configuration based upon a configuration template provided by the CPE A device 110 upon connecting to the configuration manager 152 to request a recovery configuration. According to one embodiment, the configuration manager 152 is a Cisco CNS 2100 Series Intelligence Engine ("IE 2100"), from Cisco Systems, Inc.

3.0 Method for Reverting to a Recovery Configuration in Response to Device Faults 3.1 Overview According to one embodiment, reverting to a recovery configuration in response to device faults is facilitated by a storable recovery configuration that enables a device to establish connectivity to a configuration manager. The configuration manager provides a network level configuration to the device, enabling the device to re-establish connectivity to other devices in the network substantially independent of human intervention.

Figure 2A:
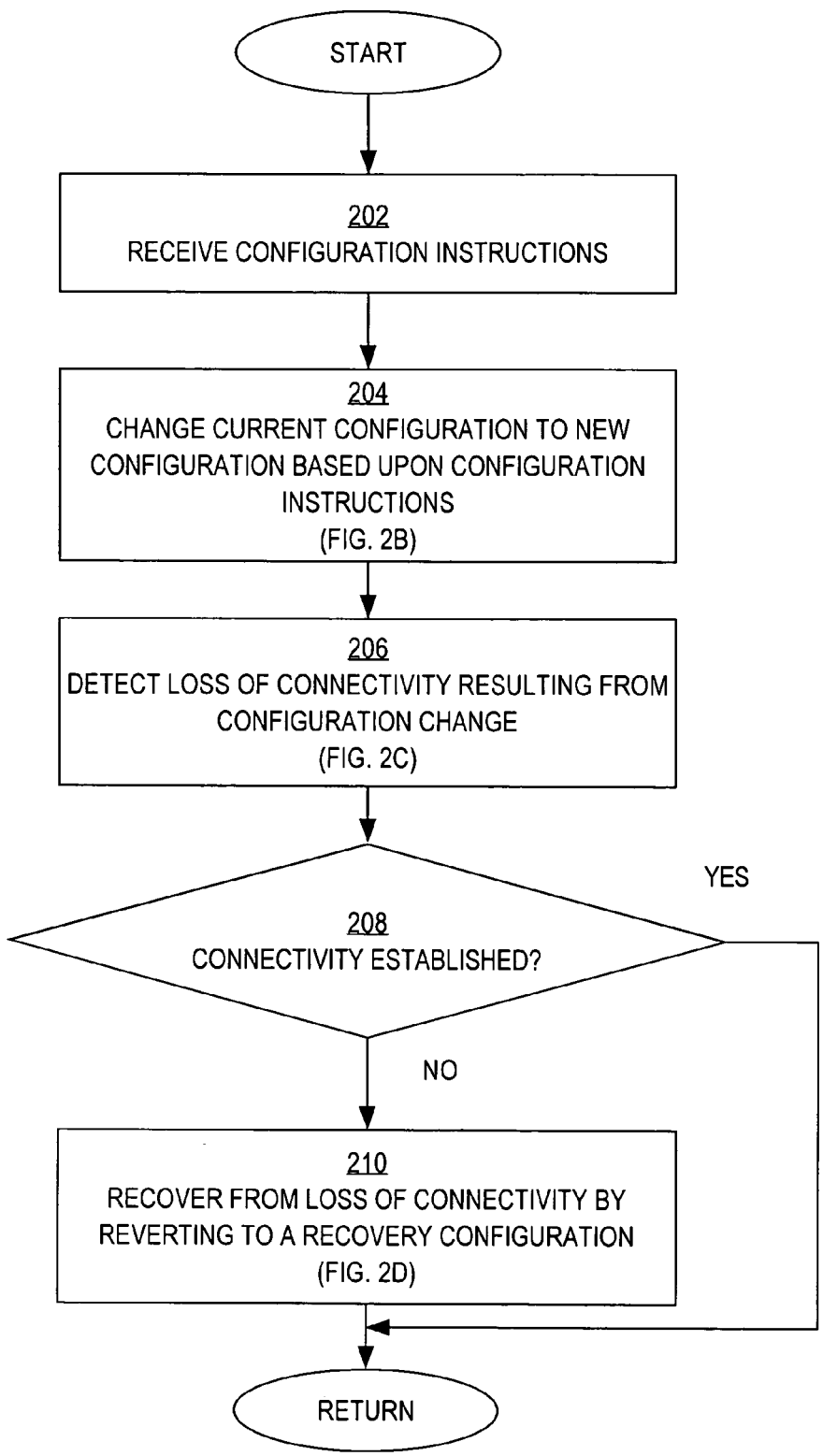
FIG. 2A is a flow diagram that illustrates a high level overview of one embodiment of processing for reverting to a recovery configuration.

FIG. 2A is a flow diagram that illustrates a high level overview of one embodiment of a method for reverting to a recovery configuration. In block 202, the configuration instructions are received. Configuration instructions may include directions to change the current configuration of the device, which may be made by an IT administrator or the customer in response to a perceived need or change in the network environment.

In block 204, the current configuration of the device is changed to a new configuration based upon the configuration instructions as discussed below in connection with FIG. 2B.

In block 206, the device tests whether connectivity has been lost resulting from the configuration change as discussed below in connection with FIG. 2C.

In block 208, a determination is made whether a connection has been established using the changed configuration. If connectivity is established with the new configuration, then the processing of FIG. 2A is completed.

Otherwise, if the connection is not established, then in block 210, an automated recovery process is invoked in order to establish connectivity by reverting to a recovery configuration, as is described in further detail with reference to FIG. 2D.

3.2 Process of Changing a Configuration

Figure 2B:
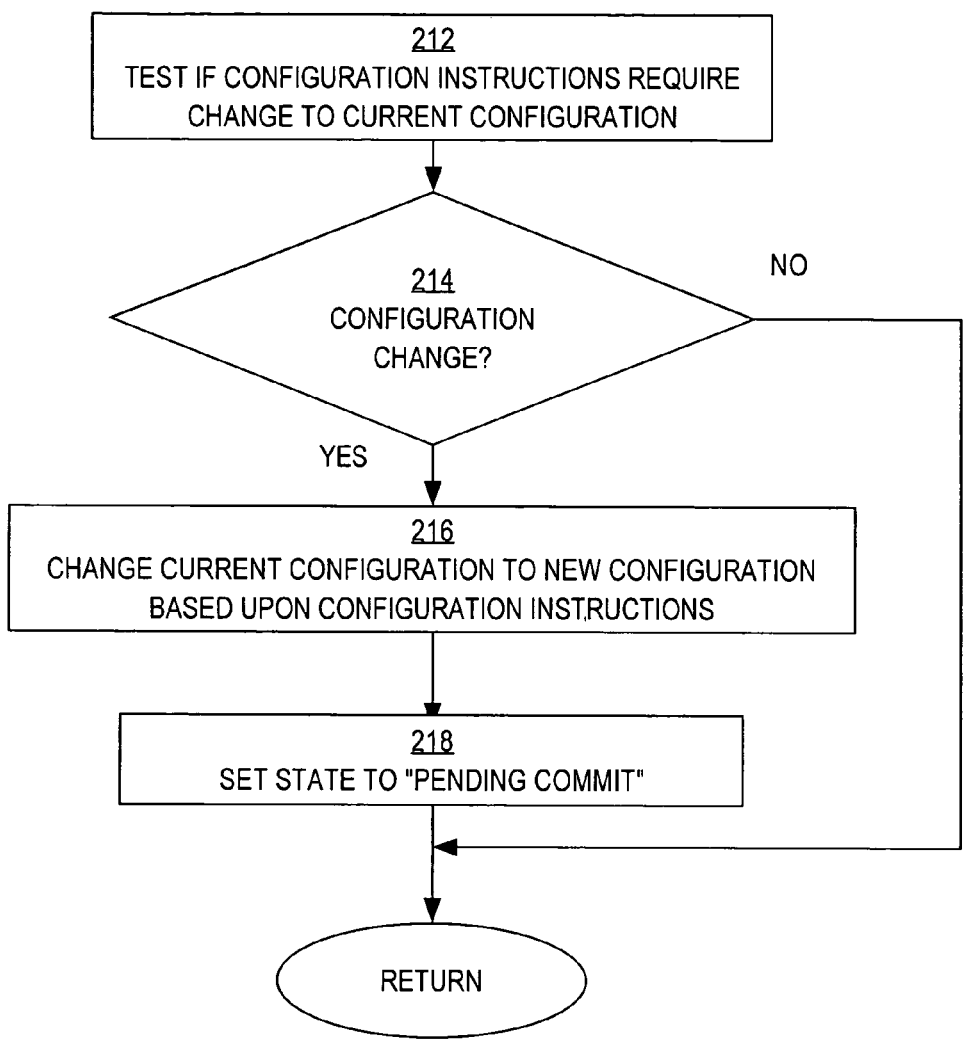
FIG. 2B is a flow diagram that illustrates a high level overview of receiving and processing a change to a configuration operable with the processing depicted by FIG. 2A in one embodiment.

FIG. 2B is a flow diagram that illustrates a high level overview of receiving and processing a change to a configuration operable with the processing depicted by FIG. 2A in one embodiment. In block 212, the configuration instructions are tested to determine whether a change to the current configuration is required.

In block 214, a test is performed to determine if the configuration is to be changed. If a configuration change is to be made, then control passes to block 216. Otherwise processing for this task completes and control returns back to block 204 of FIG. 2A.

In block 216, the current device configuration is changed to the new configuration based upon configuration instructions. Depending upon the implementation and the nature of the change, the current device configuration may be completely replaced with a new configuration that reflects the change, or changes may be made to a portion of the current device configuration to reflect the change.

In block 218, the state for the device configuration is set to "pending commit" state. The pending commit state indicates that a change to the device configuration has been made, but the new device configuration has not been tested for connectivity.

3.3 Process of Detecting a Device Fault

Figure 2C:
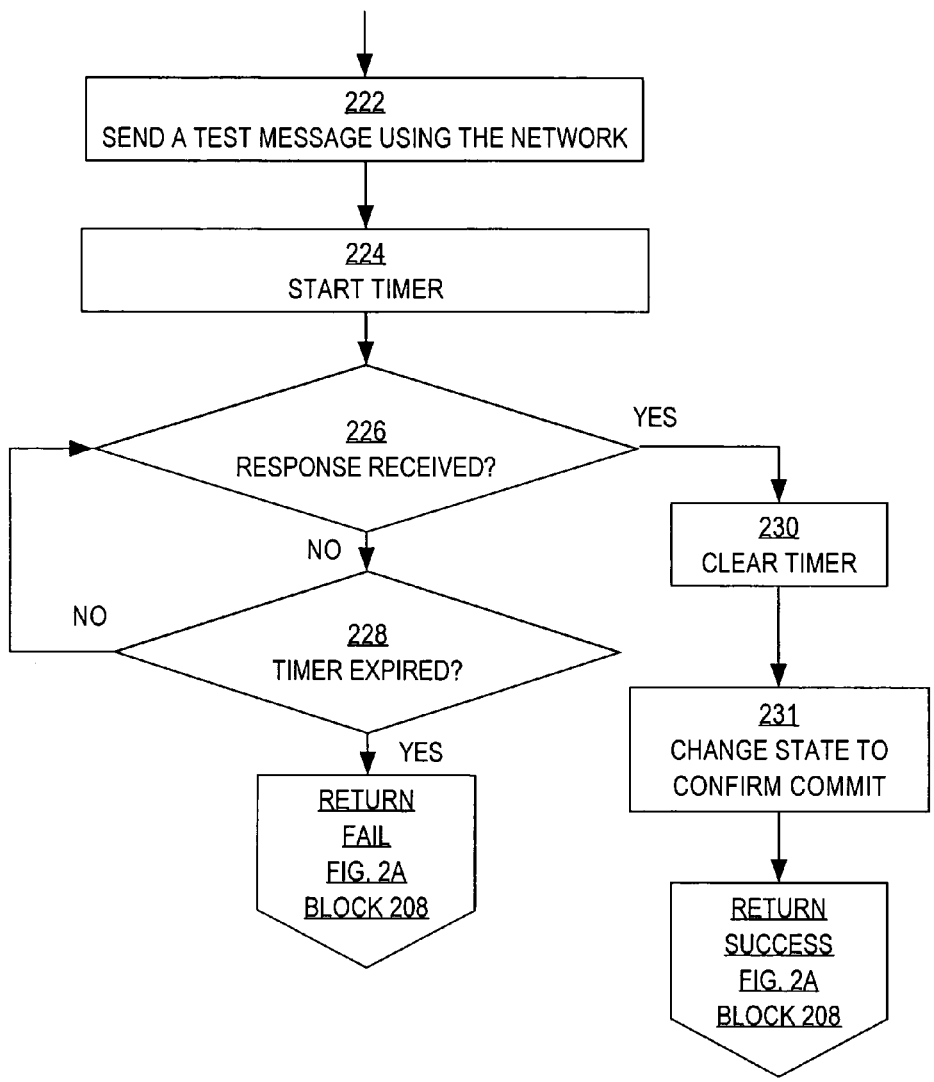
FIG. 2C is a flow diagram that illustrates a high level overview of detecting a loss of connectivity resulting from a configuration change operable with the processing depicted by FIG. 2A in one embodiment.

FIG. 2C is a flow diagram that illustrates a high level overview of detecting a loss of connectivity resulting from a configuration change in one embodiment. In block 222 a test message is sent using the network. In one embodiment, a ping or Internet Control Message Protocol (ICMP) message is used to test connectivity with a remote device via the network connection under test. In one embodiment, the CPE A 110 device builds a ping message. The CPE A 110 device copies a known network address of a known device on the network into the destination address field of the ping message header and copies its own network address in the sender address field of the ping message header. Then, the CPE A 110 device sends the ping message to the destination along the network. The CPE A 110 device may send the test message to any destination specified by the recovery configuration, however, in one embodiment, the configuration server is used as the destination device.

In block 224, a timer is started.

In block 226, the device tests to see if the ping result is successful by checking to see if a response to the ping message was received. If a response is received then the ping message is determined to be successful.

If the ping is successful, then in block 230, the timer is cleared. In block 231, the configuration state is changed from "pending commit" to "confirm commit." At this point connectivity in the network is established using the newly changed configuration and control returns back to block 208 of FIG. 2A with an indication that connectivity has been successfully established.

If no response to the ping message was received in block 226, then in block 228, another test is performed to determine if the timer has expired. If the timer has not expired, then processing continues back with block 226 to again check if a response to the ping message has been received. If the timer has expired, then no response has been received within the time allotted, then a failure of connectivity is established. In this case, control returns to block 208 of FIG. 2A with an indication that connectivity has not been established.

3.4 Process of Reverting to a Recovery Configuration

Figure 2D:
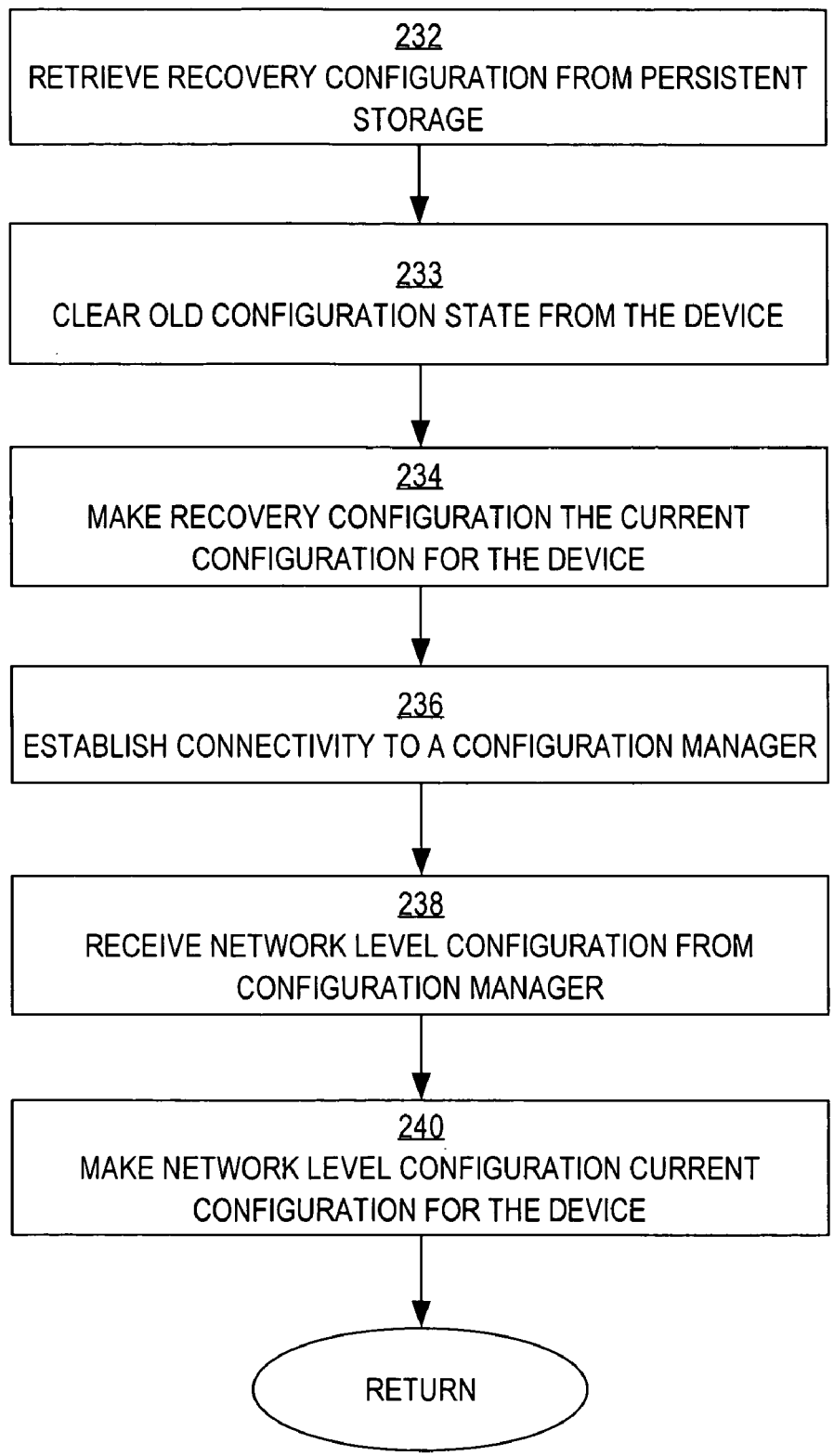
FIG. 2D is a flow diagram that illustrates a high level overview of recovering from a loss of connectivity using a recovery configuration in one embodiment.

FIG. 2D is a flow diagram that illustrates a high level overview of recovering from a loss of connectivity using a recovery configuration in one embodiment. In block 232, a recovery configuration is retrieved. The recovery configuration is a configuration for a state that enables the CPE A 110 device to establish connectivity to the configuration manager. In one embodiment, retrieving the recovery configuration also includes obtaining security credentials to enable the CPE A 110 device to access the configuration manager. Security credentials include, without limitation encryption keys, certificates, or the like.

In one embodiment, the recovery configuration is stored in persistent storage. For example, the recovery configuration may be stored in a programmable read-only memory (PROM), a flash memory, an electrically alterable programmable read-only memory (EAPROM) or a direct access storage device (DASD), CD-ROM, DVD, tape, removable storage such as USB memory ("jump drives") or the like. In various embodiments, the recovery configuration may be an XML formatted file, or a file formatted in either a human or a machine-only readable format, or may be encrypted using an encryption technique or the like. In one embodiment, however, the recovery configuration is a text file.

In block 233, the old configuration state is cleared. In block 234, the recovery configuration is made the current configuration for the device. When the recovery configuration is made the current configuration, a process in the CPE A 110 device copies the recovery configuration file to the current configuration file and reboots the CPE A 110 device. When the device boots, the recovery configuration, now also the current configuration, is loaded into memory for the CPE A 110 device to use.

In block 236, connectivity to a configuration manager is established using the recovery configuration. In one embodiment, the recovery configuration emulates a boot configuration shipped with the CPE A 110 device, so that when the device uses a recovery configuration the device will appear to be a new machine joining the network to the configuration manager. In an alternative embodiment, the recovery configuration is sufficiently different from the boot configuration shipped with the CPE A 110 device, so that the device using the recovery configuration will not appear to be a new machine joining the network to the configuration manager. In this embodiment, the configuration manager will identify the CPE A 110 device as a device seeking reconfiguration.

In block 238, a network level configuration is received from the configuration manager. Based upon an identifier provided by the CPE A 110 device, the configuration manager obtains a network configuration for the CPE A 110 device by searching a database accessible to the configuration manager using the identifier, as is described in further detail with reference to FIGS. 3A and 3B below. The network configuration, in one embodiment, is configured to the interfaces shipped with the CPE A 110 device, in order to enable the device to establish connectivity using the interfaces installed in the CPE A 110 device. The configuration manager sends the network level configuration to the CPE A 110 device.

In block 240, the network level configuration is made the current configuration for the device. The CPE A 110 device copies the network level configuration received from the configuration manager into the current configuration for the device. Then, the CPE A 110 device reboots, loads the network level configuration into memory and uses the configuration to regain functionality as a network element substantially free of operator intervention.

In one embodiment, the configuration manager may make updates to the recovery configuration. When the CPE A 110 device receives an updated recovery configuration from the configuration manager, the CPE A 110 device replaces the present recovery configuration with the updated recovery configuration. In this way, the recovery configurations of many devices on the network can be kept current in order to accommodate for changes in network environments, the configuration manager or security credentials.

In one embodiment, the owner or other user of the CPE A 110 device is blocked from changing the recovery configuration. In this way, the recovery configuration is protected from unauthorized modifications that could potentially render the CPE A 110 device incapable of automatically reestablishing connectivity to the configuration manager.

3.5 Process of Providing a Network Configuration to a Device Connecting with a Recovery Configuration FIG. 3A is a flow diagram that illustrates a high level overview of one embodiment of processing for providing a network configuration to a device connecting with a recovery configuration. In block 302a, the configuration manager receives a request for a network level configuration file.

In block 304a, the configuration manager searches a database for configuration information corresponding to the device making the request. In one embodiment, the database includes configurations for known devices on the network. The configurations for these devices may be searched using an identifier associated with each device. In one embodiment, a manufacturer using an automated provisioning service provides an appropriate configuration file for a device at the time the device is manufactured and stores the configuration file with the configuration manager. In embodiments using such automated provisioning techniques, once the customer installs the device on the customer site, the device boots using a boot configuration and establishes connectivity with the configuration manager in order to obtain a network level configuration.

A device seeking to recover its configuration might be trusted less than a new device. Generally, a system administrator knows if a new device installation is expected. The system administrator might not expect a device to need recovery however. Since a recovering device might have otherwise been compromised, in one embodiment, additional state information might be required from the recovering device prior to permitting the device to receive a recovery configuration. For example, the configuration manager may inquire whether anyone is logged into the recovering device or the like.

In block 310a, the configuration manager provides a network level configuration for the device over the network.

FIG. 3B is a flow diagram that illustrates a high level overview of another embodiment of processing for providing a network configuration to a device connecting with a recovery configuration. In block 302b, the configuration manager receives a request for a network level configuration file.

In block 304b, the configuration manager searches a database for configuration information corresponding to the device making the request.

In 306b, the configuration manager determines whether the device is a new device seeking a first network level configuration or a device using a recovery configuration to request a network level configuration. In block 308b, a test is performed to determine whether device seeking a network level configuration is a device recovering from a fault.

In block 310b, the configuration manager provides a network level configuration for the recovering device. Otherwise, in block 312b, the configuration manager provides a network level configuration for a new device.

4.0 Implementation Mechanisms—Hardware Overview

Figure 4:
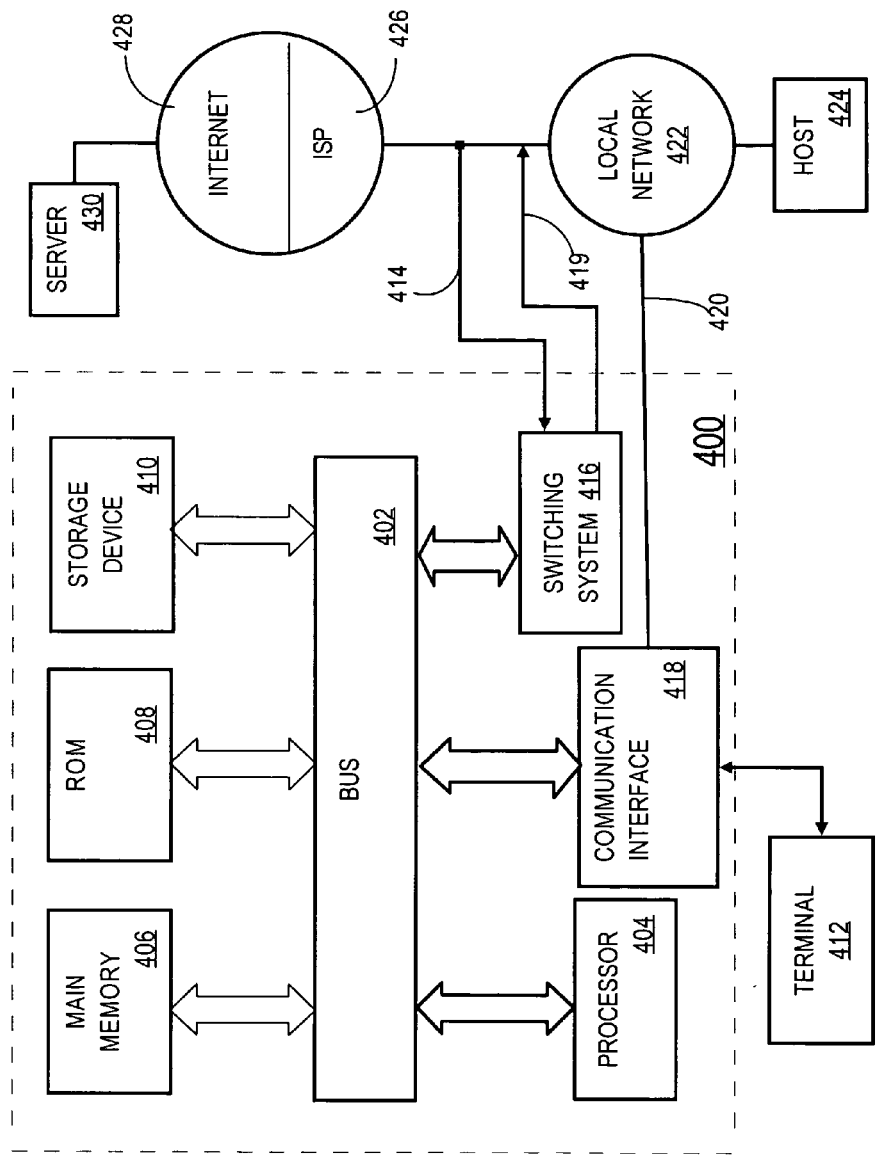
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for reverting to a recovery configuration in response to device faults. According to one embodiment of the invention, reverting to a recovery configuration in response to device faults may be provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for reverting to a recovery configuration in response to device faults as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. In particular, while the invention has been described generally with reference to one example embodiment, in which configuration instructions are provided that lead to a loss in connectivity, it will be appreciated by those skilled in the art that various modifications and changes may be made thereto without departing from the broader spirit and scope of the invention. The specification and drawings are, accordingly, to be regarded in an illustrative rather than a restrictive sense.

What is claimed is:

1. A method of reverting to a recovery configuration in response to faults of a network device, the method comprising the computer-implemented steps of:

receiving configuration instructions;

changing a current configuration to a new configuration based upon the configuration instructions;

detecting a loss of connectivity between the device and a network resulting from the configuration change; and recovering from the loss of connectivity by reverting to a recovery configuration, wherein the recovery configuration is stored in a persistent storage of the device in association with manufacturing the device, wherein the recovering step further comprises:

retrieving a recovery configuration;

making the recovery configuration the current configuration; and establishing connectivity to a configuration manager using the recovery configuration.

2. A method as recited in claim 1, wherein changing a current configuration to a new configuration based upon the configuration instructions comprises:

detecting whether the new configuration will require a change to the current configuration of the device; and if so:

making the proposed change as the current configuration and setting a flag indicating a pending commit state.

3. A method as recited in claim 1, wherein the step of detecting a loss of connectivity resulting from the configuration change further comprises the steps of:

sending a test message;

determining whether a connection is established; and invoking a recovery routine if a timeout occurs.

4. A method as recited in claim 3, wherein sending a test message comprises sending a ping message.

5. A method as recited in claim 1, wherein the step of recovering from the loss of connectivity by reverting to a recovery configuration further comprises the steps of:

receiving from the configuration manager a network level configuration; and replacing the current configuration with the network level configuration.

6. A method as recited in claim 1, wherein the recovery configuration is a boot configuration and wherein establishing connectivity to a configuration manager using the recovery configuration comprises:

establishing connectivity with the configuration manager as a new device.

7. A method as recited in claim 1, wherein the recovery configuration differs from a boot configuration and wherein establishing connectivity to a configuration manager using the recovery configuration comprises:
establishing connectivity with the configuration manager as a device seeking reconfiguration.

8. A method as recited in claim 1, wherein retrieving the recovery configuration comprises:
obtaining security credentials enabling the device to establish connectivity to the configuration manager.

9. A method as recited in claim 1, wherein retrieving the recovery configuration comprises:
obtaining a configuration for a state enabling the device to establish connectivity to the configuration manager.

10. A method as recited in claim 1, further comprising the steps of:
establishing connectivity to a network using the network level configuration as the current configuration.

11. A method as recited in claim 1, further comprising the step of:
receiving an updated recovery configuration; and
replacing the recovery configuration with the updated recovery configuration.

12. A method as recited in claim 11, wherein receiving an updated recovery configuration comprises:
connecting to a configuration manager using a maintenance network connection;
receiving from the configuration manager an updated configuration.

13. A method as recited in claim 1, further comprising:
blocking changes to the recovery configuration.

14. A method as recited in claim 1, further comprising:
committing the configuration if a connection is established and no timeout occurs.

15. A method as recited in claim 1, wherein establishing connectivity to a configuration manager using the recovery configuration comprises:
copying the recovery configuration from a persistent storage to the current configuration for the device; and
rebooting the device.

16. A method as recited in claim 15, wherein rebooting the device includes loading the recovery configuration into the memory of the device to determine the configuration of interfaces of the device.

17. A method of reverting to a recovery configuration in response to device faults, the method comprising the computer-implemented steps of:
receiving configuration instructions;
changing a current configuration to a new configuration based upon the configuration instructions by
detecting whether the new configuration will require a change to the current configuration of the device; and if so:
making the proposed change as the current configuration and setting a flag indicating pending commit;
detecting a loss of connectivity resulting from the configuration change by sending a test message;
determining whether a connection is established; and
invoking a recovery routine if a timeout occurs; and
recovering from the loss of connectivity by reverting to a recovery configuration by
making a recovery configuration stored in a persistent storage of the device in association with manufacturing the device the current configuration;
establishing connectivity to a configuration manager using the recovery configuration;
receiving from the configuration manager a network level configuration; and
replacing the current configuration with the network level configuration.

18. A computer-readable medium carrying one or more sequences of instructions for reverting to a recovery configuration in response to faults of a network device, which instructions, when executed by one or more processors, cause the one or more processors to carry out the steps of:
receiving configuration instructions;
changing the current configuration to a new configuration based upon the configuration instructions;
detecting a loss of connectivity between the device and a network resulting from the configuration change;
recovering from the loss of connectivity by reverting to a recovery configuration
wherein the recovery configuration is stored in a persistent storage of the device in association with manufacturing the device, wherein the recovering step further comprises:
retrieving the recovery configuration;
making the recovery configuration the current configuration; and
establishing connectivity to a configuration manager using the recovery configuration.

19. A computer-readable medium as recited in claim 18, further comprising instructions which, when executed by the one or more processors, cause the one or more processors to carry out the steps of:
storing the recovery configuration into a persistent storage of the device in association with manufacturing the device.

20. A computer-readable medium as recited in claim 19, wherein the instructions for changing the current configuration to a new configuration based upon the configuration instructions further comprise instructions for carrying out the steps of:
detecting whether the new configuration will require a change to the current configuration of the device; and if so:
making the proposed change as the current configuration and setting a flag indicating pending commit state.

21. A computer-readable medium as recited in claim 19, wherein the instructions for detecting a loss of connectivity resulting from the configuration change further comprise instructions for carrying out the steps of:
sending a test message;
determining whether a connection is established; and
invoking a recovery routine if a timeout occurs.

22. A computer-readable medium as recited in claim 21, wherein the instructions for sending a test message further comprising instructions for carrying out the step of:
sending a ping message.

23. A computer-readable medium as recited in claim 19, wherein the instructions for recovering from the loss of connectivity by reverting to a recovery configuration further comprise instructions for carrying out the steps of:
retrieving a recovery configuration;
making a recovery configuration the current configuration; and
establishing connectivity to a configuration manager using the recovery configuration.

24. A computer readable medium as recited in claim 23, wherein the instructions for recovering from the loss of connectivity by reverting to a recovery configuration further comprise instructions for carrying out the steps of:
receiving from the configuration manager a network level configuration; and replacing the current configuration with the network level configuration.

25. A computer-readable medium as recited in claim 23, wherein the recovery configuration is a boot configuration and wherein the instructions for establishing connectivity to a configuration manager using the recovery configuration further comprise instructions for carrying out the step of:
   establishing connectivity with the configuration manager as a new device.

26. A computer-readable medium as recited in claim 23, wherein the recovery configuration differs from a boot configuration and wherein the instructions for establishing connectivity to a configuration manager using the recovery configuration further comprise instructions for carrying out the step of:
   establishing connectivity with the configuration manager as a device seeking reconfiguration.

27. A computer-readable medium as recited in claim 23, wherein the instructions for retrieving the recovery configuration further comprise instructions for carrying out the step of:
   obtaining security credentials enabling the device to establish connectivity to the configuration manager.

28. A computer-readable medium as recited in claim 23, wherein the instructions for retrieving the recovery configuration further comprise instructions for carrying out the step of:
   obtaining a configuration for a state enabling the device to establish connectivity to the configuration manager.

29. A computer-readable medium as recited in claim 23, further comprises the steps of:
   establishing connectivity to a network using the network level configuration as the current configuration.

30. A computer readable medium as recited in claim 23, wherein the instructions for establishing connectivity to a configuration manager using the recovery configuration further comprise instructions carrying out the steps of:
   copying the recovery configuration from a persistent storage to the current configuration for the device; and
   rebooting the device.

31. A computer readable medium as recited in claim 30, wherein rebooting the device includes:
   loading the recovery configuration into the memory of the device to determine the configuration of interfaces of the device.

32. A computer-readable medium as recited in claim 19, further comprising instructions for carrying out the step of:
   receiving an updated recovery configuration; and
   replacing the recovery configuration with the updated recovery configuration.

33. A computer-readable medium as recited in claim 32, wherein the instructions for receiving an updated recovery configuration further comprising instructions for carrying out the step of:
   connecting to a configuration manager using a maintenance network connection;
   receiving from the configuration manager an updated configuration.

34. A computer-readable medium as recited in claim 19, further comprising instructions for carrying out the step of:
   blocking changes to the recovery configuration.

35. A computer-readable medium as recited in claim 19, further comprising instructions for carrying out the step of:
   committing the configuration if a connection is established and no timeout occurs.

36. A computer-readable medium as recited in claim 19, wherein the instructions for recovering from the loss of connectivity by reverting to a recovery configuration further comprise instructions for carrying out the steps of:
   retrieving a recovery configuration; and
   making a recovery configuration the current configuration.

37. An apparatus for reverting to a recovery configuration in response to device faults, comprising:
   means for storing a proposed change as the current configuration and setting a flag indicating pending commit if the new configuration will require a change to the current configuration of the device;
   means for sending a test message and determining whether a connection is established;
   means for detecting a timeout;
   means for invoking a recovery routine if a timeout occurs;
   means for making a recovery configuration the current configuration;
   means for establishing connectivity to a configuration manager using the recovery configuration;
   means for receiving from the configuration manager a network level configuration; and
   means for replacing the current configuration with the network level configuration.

38. An apparatus for reverting to a recovery configuration in response to device faults, comprising:
   a network interface that is coupled to the data network for receiving one or more packet flows therefrom;
   a processor;
   one or more stored sequences of instructions which, when executed by the processor, cause the processor to carry out the steps of:
      receiving configuration instructions;
      changing a current configuration to a new configuration based upon the configuration instructions by
         detecting whether the new configuration will require a change to the current configuration of the device; and if so:
         making the proposed change as the current configuration and setting a flag indicating pending commit;
      detecting a loss of connectivity resulting from the configuration change by sending a test message;
      determining whether a connection is established;
      detecting a timeout; and
      invoking a recovery routine if a timeout occurs; and
      recovering from the loss of connectivity by reverting to a recovery configuration by
         making a recovery configuration stored in a persistent storage of the device in association with manufacturing the device the current configuration;
         establishing connectivity to a configuration manager using the recovery configuration;
         receiving from the configuration manager a network level configuration; and
         replacing the current configuration with the network level configuration.

* * * * *